US012730903B1

(12) United States Patent
Elbaz et al.

(10) Patent No.: US 12,730,903 B1
(45) Date of Patent: Sep. 8, 2026

(54) END-TO-END AI ASSET REMEDIATION

(71) Applicant: Onyx Security Ltd., Tel Aviv (IL)

(72) Inventors: Gil Elbaz, Tel Aviv (IL); Maxim Kogan, Tel Aviv (IL)

(73) Assignee: Onyx Security Ltd., Tel Aviv (IL)

( * ) Notice: Subject to any disclaimer, the term of this patent is extended or adjusted under 35 U.S.C. 154(b) by 0 days.

(21) Appl. No.: 19/406,138

(22) Filed: Dec. 2, 2025

(51) Int. Cl.
*G06F 21/57* (2013.01)

(52) U.S. Cl.
CPC .................................. *G06F 21/577* (2013.01)

(58) Field of Classification Search
CPC ......... G06F 21/577; G06F 21/56; G06F 21/55
See application file for complete search history.

(56) References Cited

U.S. PATENT DOCUMENTS 8,176,019 B2 5/2012 Brodie et al.
8,230,387 B2 7/2012 Srivastava et al.
9,311,615 B2 4/2016 Davenport et al.
10,860,721 B1 12/2020 Gentile
11,102,052 B2 8/2021 Sharma
11,212,316 B2 12/2021 Sweeney et al.
11,283,840 B2 3/2022 Murray et al.
11,503,061 B1 * 11/2022 Lin ...................... H04L 63/102
11,748,458 B2 9/2023 Sarkar
11,863,578 B1 1/2024 Speck et al.
12,088,599 B1 9/2024 McCarson
12,326,900 B1 6/2025 Bianchi et al.
12,363,156 B1 7/2025 Thompson et al.
12,388,806 B2 8/2025 Davis et al.
12,418,556 B2 9/2025 Hamdi
12,481,665 B1 11/2025 Gargano et al.
12,499,329 B2 12/2025 Shah et al.
2002/0059093 A1 5/2002 Barton et al.
2003/0229525 A1 12/2003 Callahan et al.
2004/0093408 A1 5/2004 Hirani et al.
2004/0260566 A1 12/2004 King
2006/0100958 A1 5/2006 Cheng et al.
2007/0288253 A1 12/2007 Cobb et al.
(Continued)

OTHER PUBLICATIONS

Chandel et al., "Endpoint Protection: Measuring the Effectiveness of Remediation Technologies and Methodologies for Insider Threat," 2019 International Conference on Cyber-Enabled Distributed Computing and Knowledge Discovery (CyberC) Year: 2019 | Conference Paper | Publisher: IEEE.*
(Continued)

*Primary Examiner* — Roderick Tolentino
(74) *Attorney, Agent, or Firm* — M&B IP Analysts, LLC

(57) ABSTRACT

A system and method for end-to-end AI asset remediation are presented. The method includes analyzing a plurality of identified security risks, compliance risks, and security posture gaps to determine an optimal remediation path; constructing a remediation plan based on the optimal remediation path, whereby the constructed remediation plan comprises a plurality of generated corrective actions; performing one or more simulations of the plurality of generated corrective actions to verify one or more underlying root causes and to assess potential operational and security impacts; executing the plurality of generated corrective actions across internal and external systems; and performing post-action reevaluation to validate success of the executed plurality of generated corrective actions.

25 Claims, 4 Drawing Sheets

(56) References Cited

U.S. PATENT DOCUMENTS

2008/0015913 A1 1/2008 Courtney et al.
2008/0033775 A1 2/2008 Dawson et al.
2008/0082609 A1 4/2008 O'Sullivan et al.
2008/0221944 A1 9/2008 Kelly et al.
2009/0319312 A1 12/2009 Moerdler et al.
2010/0324952 A1 12/2010 Bastos et al.
2011/0055119 A1 3/2011 Sengupta
2014/0129457 A1 5/2014 Peeler
2014/0137257 A1 5/2014 Martinez et al.
2016/0012235 A1 1/2016 Lee et al.
2016/0366080 A1 12/2016 Bastide et al.
2017/0126712 A1 5/2017 Crabtree et al.
2017/0330197 A1* 11/2017 DiMaggio ............ G06Q 30/018
2017/0357502 A1 12/2017 Barday
2018/0191730 A1* 7/2018 Deters ................... G06F 21/552
2018/0268318 A1 9/2018 Matam et al.
2018/0285887 A1 10/2018 Maung
2019/0207981 A1 7/2019 Sweeney et al.
2019/0355060 A1 11/2019 Collins et al.
2021/0211472 A1 7/2021 Murray et al.
2021/0216928 A1 7/2021 O'Toole et al.
2021/0326411 A1 10/2021 Sarkar
2021/0334386 A1 10/2021 AlGhamdi et al.
2021/0335367 A1 10/2021 Graff et al.
2021/0374767 A1 12/2021 Kurian et al.
2022/0050828 A1 2/2022 Wu et al.
2022/0188717 A1 6/2022 Daley et al.
2022/0366332 A1 11/2022 Duessel
2022/0407883 A1* 12/2022 Rao ..................... H04L 63/1433
2023/0061234 A1 3/2023 Calado et al.
2023/0113332 A1* 4/2023 Crabtree ............... G06F 21/554 726/22
2023/0208882 A1 6/2023 Crabtree et al.
2023/0269272 A1 8/2023 Dambrot et al.
2023/0283521 A1 9/2023 Berger et al.
2023/0308474 A1* 9/2023 Thompson .......... H04L 63/1416
2023/0315764 A1 10/2023 Kumar et al.
2023/0328095 A1* 10/2023 Chesla ................ H04L 63/1425 726/23
2024/0163304 A1 5/2024 Gupta
2024/0223587 A1 7/2024 Berger et al.
2024/0314158 A1 9/2024 Bourzikas
2024/0348664 A1 10/2024 Mohanram et al.
2024/0411867 A1 12/2024 Sakazi et al.
2024/0420161 A1 12/2024 Shah et al.
2024/0422187 A1 12/2024 Shah et al.
2025/0005488 A1 1/2025 Meline, Jr.
2025/0047701 A1 2/2025 Siddam et al.
2025/0063083 A1 2/2025 Grinberg et al.
2025/0156303 A1 5/2025 Stevens
2025/0200290 A1 6/2025 Birru et al.
2025/0247414 A1* 7/2025 Baragaba ............ H04L 63/1433
2025/0317464 A1 10/2025 Mehrotra et al.
2025/0335598 A1* 10/2025 Charles ................. G06F 21/577
2025/0358296 A1* 11/2025 Ray ..................... H04L 63/1416
2025/0377864 A1 12/2025 Dangi et al.
2025/0378178 A1* 12/2025 Pettingill .............. G06F 21/577
2025/0384374 A1 12/2025 Ohashi et al.
2025/0390352 A1 12/2025 Crabtree et al.
2026/0017386 A1 1/2026 Ohayon et al.
2026/0039674 A1 2/2026 Siekman et al.
2026/0081939 A1 3/2026 Boyer

OTHER PUBLICATIONS

Alkady et al., "Pentora: an Integrated Framework for Automated Web and Network Vulnerability Assessment," 2025 International Mobile, Intelligent, and Ubiquitous Computing Conference (MIUCC) Year: 2025 | Conference Paper | Publisher: IEEE.*
Disrupting the First Reported AI-Orchestrated Cyber Espionage Campaign: Full Report (Nov. 2025), https://www-cdn.anthropic.com/b2a76c6f6992465c09a6f2fce282f6c0cea8c200.pdf (accessed Nov. 25, 2025).
Artificial Intelligence Risk & Governance Wharton, University of Pennsylvania, Jan. 11, 2023 (Year: 2023).
Artificial Intelligence Risk Management Framework: Generative Artificial Intelligence Profile National Institute of Standards and Technology, NIST, Jul. 2024 (Year: 2024).
Establishing a Governance Framework for AI-Powered Applications PaloAlto Networks, Cortex Cloud, White Paper, (Year: 2025.
Keller, Brandon, AI Security Posture Management (AI-SPM): What it is and How it Works Forcepoint, Apr. 18, 2025 (Year: 2025).
Kundu, Rohit, Comprehensive Guide to Large Language Model (LLM) Security Lakera, May 21, 2025 (Year: 2025).
LLM Security for Enterprises: Risks and Best Practices Wiz Experts Team, Wiz, Oct. 12, 2025 (Year: 2025).
Milovanovic, Miroslav, Primer: AI Security Posture Management (AI-SPM) Knostic, 2025 (Year: 2025).
Poter, Alexis, AI SPM: AI Security Posture Management Big.ID Next, Sep. 23, 2025 (Year: 2025).
Saura, Pablo Fernandez et al., On Automating Security Policies with Contemporary LLMs (short paper) arXiv, Jun. 5, 2025 (Year: 2025).
Simplify Custom Posture Rule Creation with Upwind's LLM-based Rego Support Upwind.io, 2025 (Year: 2025).
Streamline AI Governance with Informatic Informatica, eBook, 2025 (Year: 2025).
What is AI-SPM (AI Security Posture Management)? SentinelOne, Sep. 3, 2025 (Year: 2025).

* cited by examiner

END-TO-END AI ASSET REMEDIATION

TECHNICAL FIELD

This disclosure relates, generally, to the field of computing, particularly, to cybersecurity and artificial intelligence (AI), and more particularly, to end-to-end AI asset remediation.

BACKGROUND

Artificial intelligence (AI) technologies have become foundational components of modern enterprise ecosystems, powering automation, analytics, and intelligent decision-making across diverse operational domains. Enterprises now rely on a broad spectrum of AI assets, such as large language models, machine learning pipelines, predictive engines, and generative AI systems, deployed across hybrid infrastructures that span on-premises systems, cloud environments, and third-party platforms.

While these AI assets enable substantial business value, as the number and complexity of AI assets increase, so too does the challenge of maintaining their security, compliance, and operational integrity. AI assets often process sensitive or regulated data, operate autonomously, and evolve through continuous retraining or integration with new data sources. These characteristics of AI assets introduce unique risks, including model drift, data leakage, adversarial exploitation, misconfiguration, and unauthorized access.

Currently, remediation efforts typically rely on manual intervention, ad hoc scripting, or generic IT security workflows that are not designed for the operational and architectural nuances of AI models and their pipelines, thereby leading to extended exposure windows, inconsistent corrective actions, and potential propagation of compromised or noncompliant AI components. While some tools exist to identify or assess risks associated with AI systems, the remediation of those risks remains largely unaddressed in current enterprise environments. As a result, when vulnerabilities, policy violations, or anomalous behaviors are detected, organizations often lack automated, AI-specific mechanisms to isolate, correct, or restore affected assets.

Additionally, existing enterprise posture management and governance frameworks offer limited automation capabilities for remediating AI-specific issues, as they generally stop at detection or reporting, without closing the loop to enforce corrective measures, such as model rollback, configuration adjustment, retraining with verified data, or revalidation of access policies. Consequently, enterprises remain unable to ensure that their AI assets return to a secure and compliant state after a threat, anomaly, or failure is identified. Thus, there exists a need for an implementation of end-to-end AI asset remediation that is capable of autonomously remediating AI assets across an enterprise environment, by continuously identifying the root cause of AI-specific vulnerabilities or misconfigurations, executing targeted corrective actions, and validating the post-remediation states of affected assets, to allow for the implementation of a comprehensive AI remediation framework that would reduce response time, minimize human error, and maintain the continuous security and reliability of AI operations across the enterprise.

Therefore, it would be advantageous to provide an efficient solution that would cure the deficiencies noted above.

SUMMARY

A summary of several example embodiments of the disclosure follows. This summary is provided for the convenience of the reader to provide a basic understanding of such embodiments and does not wholly define the breadth of the disclosure. This summary is not an extensive overview of all contemplated embodiments and is intended to neither identify key nor critical elements of all embodiments nor to delineate the scope of any or all aspects. Its sole purpose is to present some concepts of one or more embodiments in a simplified form as a prelude to the more detailed description that is presented later. For convenience, the term "some embodiments" or "certain embodiments" may be used herein to refer to a single embodiment or multiple embodiments of the disclosure.

A system of one or more computers can be configured to perform particular operations or actions by virtue of having software, firmware, hardware, or a combination of them installed on the system that in operation causes or cause the system to perform the actions. One or more computer programs can be configured to perform particular operations or actions by virtue of including instructions that, when executed by a data processing apparatus, cause the apparatus to perform the actions.

In one general aspect, the method may include analyzing a plurality of identified security risks, compliance risks, and security posture gaps to determine an optimal remediation path; constructing a remediation plan based on the optimal remediation path, where the constructed remediation plan may include a plurality of generated corrective actions; performing one or more simulations of the plurality of generated corrective actions to verify one or more underlying root causes and to assess potential operational and security impacts; executing the plurality of generated corrective actions across internal and external systems; and performing post-action reevaluation to validate success of the executed plurality of generated corrective actions. Other embodiments of this aspect include corresponding computer systems, apparatus, and computer programs recorded on one or more computer storage devices, each configured to perform the actions of the methods.

Implementations may include one or more of the following features. The method may include: reconstructing the constructed remediation plan based on results of the performed one or more simulations, wherein the simulation results indicate at least one of: a different or deeper root cause, an unintended operational or security impact, a requirement that one or more corrective actions include additional steps or revised sequencing, a determination that one or more corrective actions are unnecessary, or a need to reevaluate compliance or governance requirements.

The method where analyzing the plurality of identified security risks, compliance risks, and security posture gaps to determine the optimal remediation path may include using, at least in part, a remediation intelligence engine to maximize risk reduction across an enterprise environment.

The method where performing the post-action reevaluation to validate the success of the executed plurality of generated corrective actions may include using, at least in part, a reasoning model to implement a closed-loop verification process.

The method where executing the plurality of generated corrective actions across the internal and external systems may include using, at least in part, a reasoning model to autonomously deploy the plurality of generated corrective actions.

The method where constructing the remediation plan based on the optimal remediation path may include using, at least in part, a reasoning model to perform advanced reasoning to analyze the plurality of identified security risks, compliance risks, and security posture gaps, established platform integrations, organizational policies, and a textual recipe book.

The method where performing the one or more simulations of the plurality of generated corrective actions may include using, at least in part, a reasoning model to apply the plurality of generated corrective actions within a controlled environment.

The method where the success of the executed plurality of generated corrective actions is determined based on resolving the plurality of identified security risks, compliance risks, and security posture gaps across a plurality of discovered AI assets in an enterprise environment.

The method where a discovered AI asset may include any one of: a tool, a data source, or an other AI asset.

The method where performing the post-action reevaluation further may include: performing a posture management process; and performing a runtime protection process.

The method may include: implementing a closed-loop verification process that uses results of the performed post-action reevaluation to improve future remediation efforts.

The method where the plurality of identified security risks, compliance risks, and security posture gaps are identified through a performed posture management process and a performed runtime protection process. Implementations of the described techniques may include hardware, a method or process, or a computer tangible medium.

In one general aspect, the system may include one or more processors configured to: analyze a plurality of identified security risks, compliance risks, and security posture gaps to determine an optimal remediation path; construct a remediation plan based on the optimal remediation path, where the constructed remediation plan may include a plurality of generated corrective actions; perform one or more simulations of the plurality of generated corrective actions to verify one or more underlying root causes and to assess potential operational and security impacts; execute the plurality of generated corrective actions across internal and external systems; and perform post-action reevaluation to validate success of the executed plurality of generated corrective actions. Other embodiments of this aspect include corresponding computer systems, apparatus, and computer programs recorded on one or more computer storage devices, each configured to perform the actions of the methods.

Implementations may include one or more of the following features. The system where the one or more processors are further configured to: reconstruct the constructed remediation plan based on results of the performed one or more simulations, wherein the simulation results indicate at least one of: a different or deeper root cause, an unintended operational or security impact, a requirement that one or more corrective actions include additional steps or revised sequencing, a determination that one or more corrective actions are unnecessary, or a need to reevaluate compliance or governance requirements.

The system where the one or more processors, when analyzing the plurality of identified security risks, compliance risks, and security posture gaps to determine the optimal remediation path, are configured to use, at least in part, a remediation intelligence engine to maximize risk reduction across an enterprise environment.

The system where the one or more processors, when performing the post-action reevaluation to validate the success of the executed plurality of generated corrective actions, are configured to use, at least in part, a reasoning model to implement a closed-loop verification process.

The system where the one or more processors, when executing the plurality of generated corrective actions across the internal and external systems, are configured to use, at least in part, a reasoning model to autonomously deploy the plurality of generated corrective actions.

The system where the one or more processors, when constructing the remediation plan based on the optimal remediation path, are configured to use, at least in part, a reasoning model to perform advanced reasoning to analyze the plurality of identified security risks, compliance risks, and security posture gaps, established platform integrations, organizational policies, and a textual recipe book.

The system where the one or more processors, when performing the one or more simulations of the plurality of generated corrective actions, are configured to use, at least in part, a reasoning model to apply the plurality of generated corrective actions within a controlled environment.

The system where the success of the executed plurality of generated corrective actions is determined based on resolving the plurality of identified security risks, compliance risks, and security posture gaps across a plurality of discovered AI assets in an enterprise environment.

The system where a discovered AI asset may include any one of: a tool, a data source, or an other AI asset.

The system where the one or more processors, when performing the post-action reevaluation, are configured to: perform a posture management process; and perform a runtime protection process.

The system where the one or more processors are further configured to: implement a closed-loop verification process that uses results of the performed post-action reevaluation to improve future remediation efforts.

The system where the plurality of identified security risks, compliance risks, and security posture gaps are identified through a performed posture management process and a performed runtime protection process. Implementations of the described techniques may include hardware, a method or process, or a computer tangible medium.

In one general aspect, a non-transitory computer-readable medium may include one or more instructions that, when executed by one or more processors of a device, cause the device to: analyze a plurality of identified security risks, compliance risks, and security posture gaps to determine an optimal remediation path; construct a remediation plan based on the optimal remediation path, where the constructed remediation plan may include a plurality of generated corrective actions; perform one or more simulations of the plurality of generated corrective actions to verify one or more underlying root causes and to assess potential operational and security impacts; execute the plurality of generated corrective actions across internal and external systems; and perform post-action reevaluation to validate success of the executed plurality of generated corrective actions. Other embodiments of this aspect include corresponding computer systems, apparatus, and computer programs recorded on one or more computer storage devices, each configured to perform the actions of the methods.

BRIEF DESCRIPTION OF THE DRAWINGS

The subject matter disclosed herein is particularly pointed out and distinctly claimed in the claims at the conclusion of the specification. The foregoing and other objects, features, and advantages of the disclosed embodiments will be apparent from the following detailed description taken in conjunction with the accompanying drawings. In the drawings:

DETAILED DESCRIPTION

Figure 1:
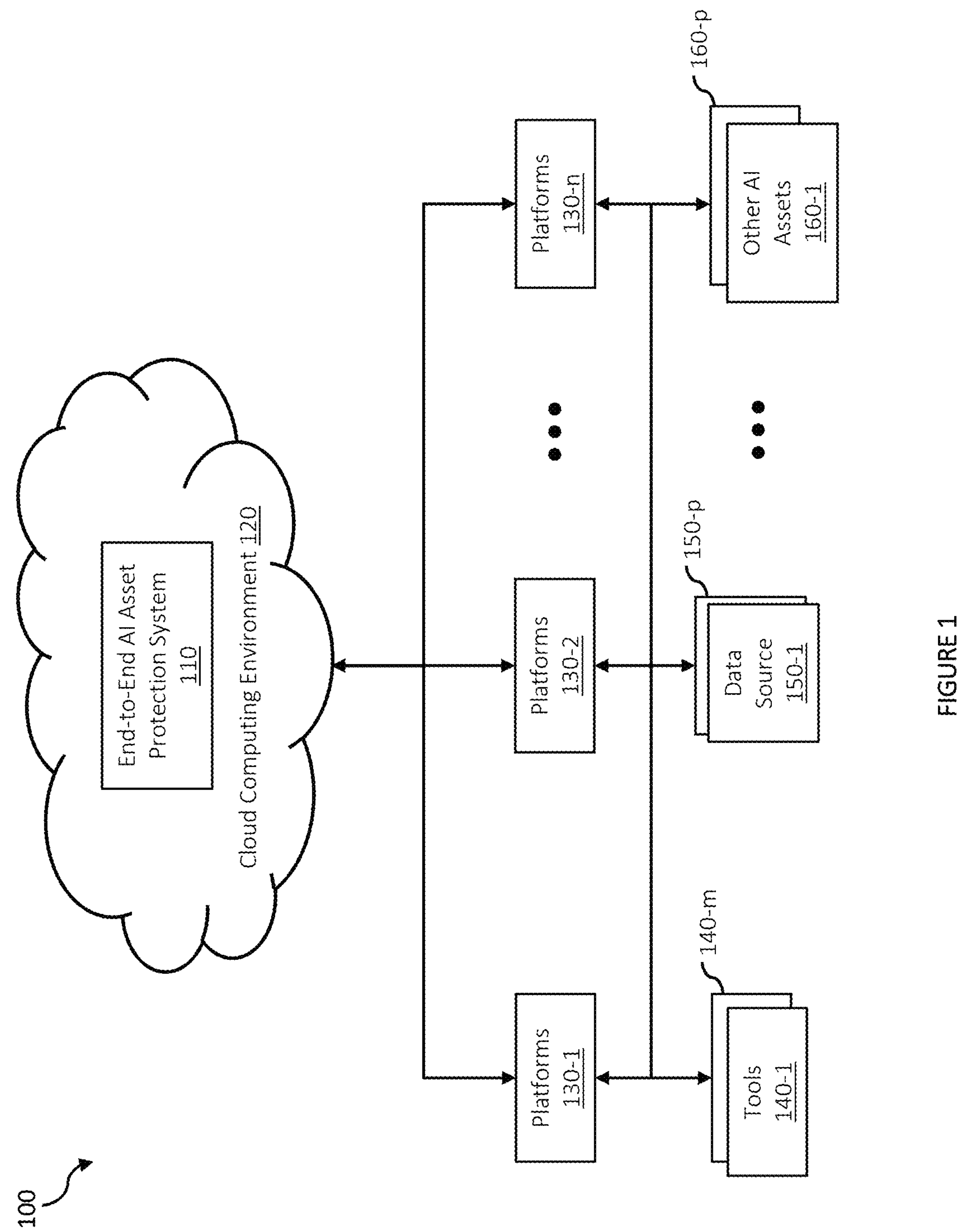
FIG. 1 illustrates an example network diagram utilized to describe various embodiments.

The embodiments disclosed herein are only examples of the many possible advantageous uses and implementations of the innovative teachings presented herein. In general, statements made in the specification of the present application do not necessarily limit any of the various claimed embodiments. Moreover, some statements may apply to some inventive features but not to others. In general, unless otherwise indicated, singular elements may be in plural and vice versa with no loss of generality. In the drawings, like numerals refer to like parts through several views.

The disclosed embodiments present a method and system for end-to-end AI asset remediation. The method and system can both determine an optimal remediation path and construct a remediation plan based on security posture gaps and security and compliance risks discovered across AI assets and their ecosystems, thereby enabling both autonomous detection and planning of remediation. Also, the method and system can simulate generated corrective actions in a controlled environment before executing the corrective actions, thereby enabling assessment of root cause(s) and the potential impacts of any changes, and as a result, minimize unnecessary disruption. Additionally, the method and system can perform both internal and external remediation, as well as a closed-loop verification, thereby enabling complete remediation throughout an entire enterprise environment, and as a result, ensuring all security posture gaps and security and compliance risks present in the enterprise environment are resolved.

Security posture gaps, also referred to as posture gaps, are differences between an intended or ideal security posture, i.e., what should be enforced according to policy or configuration, and the actual state of the enterprise environment during runtime, i.e., what is really happening when applications or workloads are running. Security posture gaps can include, but are not limited to, asset/inventory visibility gaps, configuration versus runtime drift, behavioral/model gaps, policy/enforcement gaps, context/threat exposure gaps, responsiveness/remediation gaps, tooling/coverage gaps, and assurance gaps. Security posture gaps can manifest as runtime threats, anomalous behaviors, or policy violations observed through runtime.

An enterprise's governance policies establish the strategic, procedural, and operational framework that ensures an enterprise's information systems and digital assets are protected while aligning with business goals and regulatory obligations. Specifically, the enterprise's governance policies are defined to align security initiatives, define accountability for cybersecurity management and decision-making, ensure compliance with applicable standards and regulations, and protect data and systems from both internal and external threats. Enterprise governance policies can be derived from within an internal system, pulled from one or more external sources, or even derived from information uploaded to an internal system, such as one or more documents, using a reasoning model. Violations of an enterprise's governance policies can result in security and/or compliance risks, e.g., misconfigurations, overexposed connections, ungoverned data flows, policy violations, risky tool combinations, open channels, and the like.

The disclosed embodiments are operable for any computing architecture and should not be limited to any one architecture discussed hereinbelow.

The disclosed method is not a mental process and cannot be performed entirely in the human mind. Rather, the method involves technical operations that are executed within a computing environment and are tied to specific technological implementations. For example, the method includes dynamically integrating with all platforms in an enterprise environment, asynchronously extracting data about all the platforms within the enterprise environment, and autonomously and continuously detecting, assessing, and remediating security and compliance risks of all discovered AI assets deployed across the enterprise environment.

The operation and effectiveness of the method depend on a variety of technical factors, including the number and type of platforms, tools, data sources, AI agents, and other AI assets, as well as the security and compliance risks present, within an enterprise environment. As such, the method may dynamically modify its operation based on both the number and types of platforms, tools, data sources, AI agents, and other AI assets, as well as the security and compliance risks present, within an enterprise environment. Such dynamic actions require the use of algorithmic decision-making, network analysis tools, and data processing capabilities, which cannot be mentally performed by a human operator.

Moreover, although a human operator may supply a system prompt and training data to the end-to-end AI asset protection system, the execution of the method remains rooted in automated processing by computing systems. It should be noted that the operator's input may inherently influence certain actions the end-to-end AI asset protection system takes, but the operational steps involved in carrying out the method are performed by the system.

Accordingly, the disclosed method is directed to a practical application of computer technology to solve a specific problem in the fields of cybersecurity and artificial intelligence (AI). It improves the ability to supervise, protect, and govern AI agents and their connected tools and resources within enterprise environments, and as a result, improves the safety of enterprise environments as a whole, by offering end-to-end remediation of AI assets through technical mechanisms that are necessarily rooted in computing technology.

FIG. 1 illustrates an example network diagram utilized to describe the various disclosed embodiments.

The network diagram 100, also referred to as computing environment 100 or enterprise environment 100, illustrated in FIG. 1 includes an end-to-end AI asset protection system 110, cloud computing environment 120, platforms 130-1, 130-2, **130-*n* (hereinafter, platform 130 in the singular or platforms 130 in the plural), tools 140-1, 140-*m* (hereinafter, tool 140 in the singular or tools 140 in the plural), data sources 150-1, 150-*p* (hereinafter, data source 150 in the singular or data sources 150 in the plural), and other AI assets 160-1, 160-*p* (hereinafter, other AI asset 160 in the singular or other AI assets 160** in the plural), all connected to a network (not shown for purposes of simplicity).

In at least one embodiment, cloud computing infrastructure (not shown for purposes of simplicity) is implemented on the network, and the cloud computing environment 120 is implemented/deployed on top of the cloud computing infrastructure. For example, in an embodiment, cloud computing infrastructure is from one cloud computing provider, such as Amazon® Web Services (AWS), Google® Cloud Services (GCS), Microsoft® Azure, Oracle Cloud®, IBM cloud®, and the like. In at least one embodiment, a cloud computing environment 120 may be deployed in various configurations, including, but not limited to, public, private, hybrid, or edge-based configurations. In an embodiment, a cloud computing environment 120 is a virtual private cloud (VPC), a virtual network (VNet), a virtual private network (VPN), a combination thereof, and the like. In at least one embodiment, the cloud computing environment 120 is a heterogeneous cloud environment. In at least one embodiment, the end-to-end AI asset protection system 110 is located/hosted on the cloud computing environment 120.

Platforms 130 are software environments, containing a plurality of AI assets, which provide tools, infrastructure, and frameworks to train, deploy, and manage AI applications and models. Platforms 130 are located in various locations within the enterprise environment 100. Platforms 130 can be AI platforms, such as Platform as a Service (PaaS), for example, Azure®, and Software as a Service (Saas), for example SALESFORCE® customer relationship management (CRM) systems, internally developed AI platforms, such as Infrastructure as a Service, (laaS), for example, AWS® and WIZ®, and third-party AI platforms, such as a system developed and maintained by an external organization, for example, CLAUDE®. More specifically, platforms 130 can include one or more data platforms, cloud platforms, security platforms, AI agent platforms, integration and middleware platforms, application platforms, AI and machine learning platforms, collaboration and productivity platforms, business platforms, and the like, or any combination thereof.

Each platform 130 contains a plurality of AI assets (not explicitly shown in FIG. 1), that are connected to one or more tools 140, one or more data sources 150, and one or more other AI assets 160, or any combination thereof. In at least one embodiment, AI assets can include other AI assets not explicitly named or depicted in FIG. 1.

Tools 140, such as native tools, MCP tools, and API tools, are software components, frameworks, and utilities that enable the creation, training, deployment, interactions, and management of AI systems, for example, GMAIL and SLACK®. Tools 140 can include data management tools, model development tools, infrastructure and compute tools, model deployment and serving tools, security, governance, and compliance tools, AI application layer tools, and the like.

Data sources 150 are repositories from which information is collected, accessed, or generated for use in training, test, and operating AI systems, such as web extensions, for example, CHROME® and MICROSOFT EDGE®, existing security stacks, CROWDSTRIKE®, analytics platforms, for example, DATABRICKS®, and databases, for example, SNOWFLAKE®, and the like.

Other AI assets 160 are any component used in the development, deployment, or operation of an AI system, besides tools 140 and data sources 150. Specifically, other AI assets 160 include autonomous or semi-autonomous computational entities, i.e., AI agents, configured to perform one or more cognitive, analytical, or generative tasks through the application of machine learning, reasoning, or other artificial intelligence techniques, as well as tools or resources that use AI to perform a specific function, such as data assets, for example, data pipelines and associated data structures, platform/software and infrastructure assets, for example, data storage systems and development platforms, executable code, one or more trained machine learning models, operational logic enabling perception, inference, decision-making, and action within a defined environment, and the like. The other AI assets 160 may further include capabilities for self-adaptation, goal-oriented behavior, and interaction with additional AI assets or external systems via defined interfaces or communication protocols. In certain embodiments, the other AI assets 160 may operate independently or as part of a multi-agent system, wherein a plurality of AI assets cooperate, compete, or coordinate to achieve complex objectives. Each other AI asset 160 may encapsulate specialized functions, such as language understanding, reasoning, planning, control, or prediction, and may maintain a persistent state or memory reflective of its operational context.

As used herein, the terms "AI asset," in the singular, and "AI assets," in the plural, include tools 140, data sources 150, and other AI assets 160.

End-to-end AI asset protection system 110, also referred to as system 110, is an agentic AI system, i.e., a class of AI systems configured to monitor, govern, and, if needed, intervene in the behavior of other AI agents/assets, effectively acting as an oversight, alignment, and safety layer in agentic AI ecosystems. System 110 can remediate existing security posture gaps and security and compliance risks in an enterprise environment 100 through constructing remediation plans, executing corrective actions across internal and external systems, and verifying outcomes, to enable an autonomous and dynamic end-to-end AI remediation framework.

System 110 is configured to collect data from platforms 130 through various connections, as described below. The system 110 can ingest data, such as metadata, runtime data, and configuration and system data, from platforms 130 through various read-only integrations, telemetry, and the like. Runtime data includes active, or content-level, data generated in real time, for example, messages, documents, chat transcripts, event payloads, and the like. Metadata includes structured data about the runtime content, for example, message IDs, timestamps, sender names, file names, owners, modification dates, calendar event times, and the like. Configuration data includes settings that define how an application or system behaves, for example, integration settings, workflow definitions, API keys, schema info, and the like. System data includes operational data generated by the system itself, for example, caches, temporary files, backups, and the like.

In at least one embodiment, system 110 is connected to AI platforms 130 using integrations via application programming interfaces (APIs). In at least one embodiment, system 110 is connected to internally developed AI platforms 130 through a gateway layer using a software development kit (SDK) or proxy. In at least one embodiment, system 110 is connected to third party AI platforms 130 through a model context protocol (MCP) gateway using a proxy.

In at least one embodiment, system 110 is realized as a MCP server, and AI platforms 130 are realized as MCP clients.

System 110 is further configured to automatically remediate security and compliance risks and security posture gaps discovered across AI assets and their ecosystems. Specifically, in at least one embodiment, system 110 can invoke a remediation engine (not shown in FIG. 1) to determine an optimal remediation path. An optimal remediation path can be the strategically best sequence of actions (e.g., modifying asset configurations, rotating credentials, disabling integrations, alerting external systems, adjusting enforcement rules, adjusting certain thresholds) to maximize risk reduction as quickly and efficiently as possible throughout the enterprise environment 100. An optimal remediation path can be provided as a path, sequence, or a prioritized set of actions. For example, an optimal remediation path can include which vulnerabilities or assets should be fixed first to break attack chains. In at least one embodiment, the optimal remediation path can include a prioritization of the actions corresponding to perceived threat levels based on the assessed risk scores given to each discovered AI asset during the performance of posture management.

The system 110 can ingest process results and determine an optimal remediation path based on its analysis of the process results. Process results can be data representing findings from previously performed AI asset discovery, posture management, and runtime protection processes, i.e., identified security posture gaps and security and compliance risks. In at least one embodiment, system 110 is further configured to autonomously construct a remediation plan. The remediation plan can be a practical, operational plan that outlines how an enterprise can remediate vulnerabilities. The remediation plan integrates the determined optimal remediation path while also accounting for additional constraints and considerations, such as regulatory requirements, system dependencies, business risk acceptance, team capacity, and patch availability. The remediation plan can include a plurality of corrective actions, such as newly generated corrective actions and actions included in the determined optimal remediation path. Specifically, corrective actions are constructed and deployed to remediate each confirmed security risk, compliance risk, and security posture gap, across the discovered AI assets and their associated ecosystems. Corrective actions can include steps to close the identified gaps and risks and to prevent recurrence (e.g., governance and policy improvements, identity and access management updates, network security enhancements, endpoint and device protections, vulnerability management, cloud and application security measures, data protection controls, monitoring and incident response activities, third-party and vendor security improvements, security awareness and training initiatives, business continuity and recovery actions). More specifically, the system 110 can invoke a reasoning model (not shown in FIG. 1) to generate the corrective actions by mapping the security posture gaps and the security and compliance risks to relevant security frameworks, applying risk-based reasoning and defense best practices, and generating actionable, context-aware fixes supported by structured remediation guidance. The reasoning model can also perform advanced reasoning, leveraging contextual state, historical interactions, policy definitions, posture evolution, risk context, and data-sensitivity information.

In at least one embodiment, system 110 is further configured to execute generated corrective actions across internal systems, i.e., internal remediation, by invoking: (1) internal APIs to, e.g., reset access tokens, rotate internal secrets, disable vulnerable endpoints, update security settings, trigger internal cleanup routines; (2) internal orchestration/automation frameworks to, e.g., deploy new service versions, apply OS patches, remove vulnerable software, update firewall configurations; and/or (3) internal policy engines to, e.g., block insecure configurations, enforce MFA/SSO requirements, prevent risky API calls, quarantine non-compliant resources.

In at least one embodiment, system 110 is further configured to execute generated corrective actions directly across external systems through previously established integrations, i.e., external remediation, by invoking: (1) direct API or SDK calls to, e.g., update configurations, disable accounts, rotate tokens, change access controls, push patches or policies, trigger security workflows; (2) third-party tools, such as cloud consoles (e.g., AWS®, Azure®, GCP®), SaaS admin dashboards/identity providers (e.g., Okta®, Microsoft 365®, Salesforce®), security platforms (e.g., CrowdStrike®, Tenable®), or endpoint management tools (e.g., Intune®) to, e.g., GUI-driven changes, vendor-provided remediation buttons, automated enforcement policies, vendor-managed patching or isolation commands; (3) automation/orchestration platforms, such as Wiz® to, e.g., enforce external configurations; and/or (4) policy engines (e.g., Zscaler®, Cloudflare®) to, e.g., enforce policy. In at least one embodiment, the system 110 can send data and generated corrective actions to integrated Security Information and Event Management (SIEM) and Security Orchestration, Automation, and Response (SOAR) systems, enabling their standard ingestion and automated response workflows.

In at least one embodiment, the system 110 is further configured to, before executing the generated corrective actions, perform simulations of the generated corrective actions. Simulations can be performed to verify underlying root causes and assess potential operational or safety impacts prior to implementation of remediation. The system 110 can invoke the reasoning model to execute the simulations, such as in staging, sandbox, or digital twin environments, and analyze the results of the simulations using its model layers (not shown in FIG. 1). Specifically, simulations include the application of the generated corrective actions (e.g., running an exploit or vulnerability scan, triggering a faulty process, replicating a misconfiguration, reproducing a server failure) to the issues that require remediation to verify the real root causes, functional impacts (e.g., does application still run, do integrations break, any performance issues, are any logs or processes affected), security impacts (e.g., is the vulnerability closed, are other security controls affected, did the change introduce new vulnerabilities), and stability impact (e.g., system reboots, memory or CPU anomalies, service restarts) prior to application of the fixes, i.e., generated corrective actions.

In at least one embodiment, the system 110 is further configured to, after applying remediation, validate success through post-action reevaluation, ensuring all issues, i.e., security posture gaps and security and compliance risks, have been neutralized or resolved. Post-action reevaluation can include reperforming the posture management and runtime protection processes.

The posture management process includes, but is not limited to: (1) generating a multi-dimensional graph using collected data from discovered AI assets within the enterprise environment 100; (2) converting the data and their relationships represented within the generated multi-dimensional graph into natural language text; (3) performing posture analysis using the data represented in the natural language text to validate an enterprise's governance policies across each of the discovered AI assets; (4) assessing risk scores to each of the discovered AI assets based on the performed posture analysis; and (5) identifying one or more of the discovered AI assets as being a critical risk based on their assessed risk scores.

The runtime protection process includes, but is not limited to: (1) analyzing collected runtime and posture data, collected from the discovered AI assets, to structure the collected runtime and posture data and identify one or more indicators of security posture gaps; (2) analyzing the structured data along with the identified one or more indicators of security posture gaps to determine a presence of one or more security posture gaps; (3) determining whether one or more additional security posture gaps could be present but not directly inferred based on the analyses; and (4) analyzing, further, the structured data, alongside user metadata, contextual states, historical interactions, and policy definitions, to determine whether the one or more additional security posture gaps are present.

In at least one embodiment, system 110 is further configured to feed learnings, i.e., new data generated throughout the entire remediation process, into its knowledge base (not shown for purposes of simplicity) to improve the accuracy and performance of the reasoning model over time, i.e., improve the system's 110 remediation logic.

Embodiments performed by system 110 and its modules and layers (not shown in FIG. 1) are discussed in more detail below. The modules of the end-to-end AI asset protection system 110 can be implemented in software (as defined herein below), firmware, hardware, or any combination thereof. Such implementations may vary depending on performance requirements, computational constraints, deployment contexts (e.g., edge vs. cloud), or other architectural considerations. It should be understood that various embodiments discussed herein are presented for purposes of illustration and description, and that the disclosed embodiments should not be limited to any one or more embodiments discussed herein.

It should be noted that although one end-to-end AI asset protection system 110 is illustrated in FIG. 1 for the sake of simplicity, the embodiments disclosed herein can be applied to a plurality of instances of the end-to-end AI asset protection system 110 per enterprise.

Figure 2:
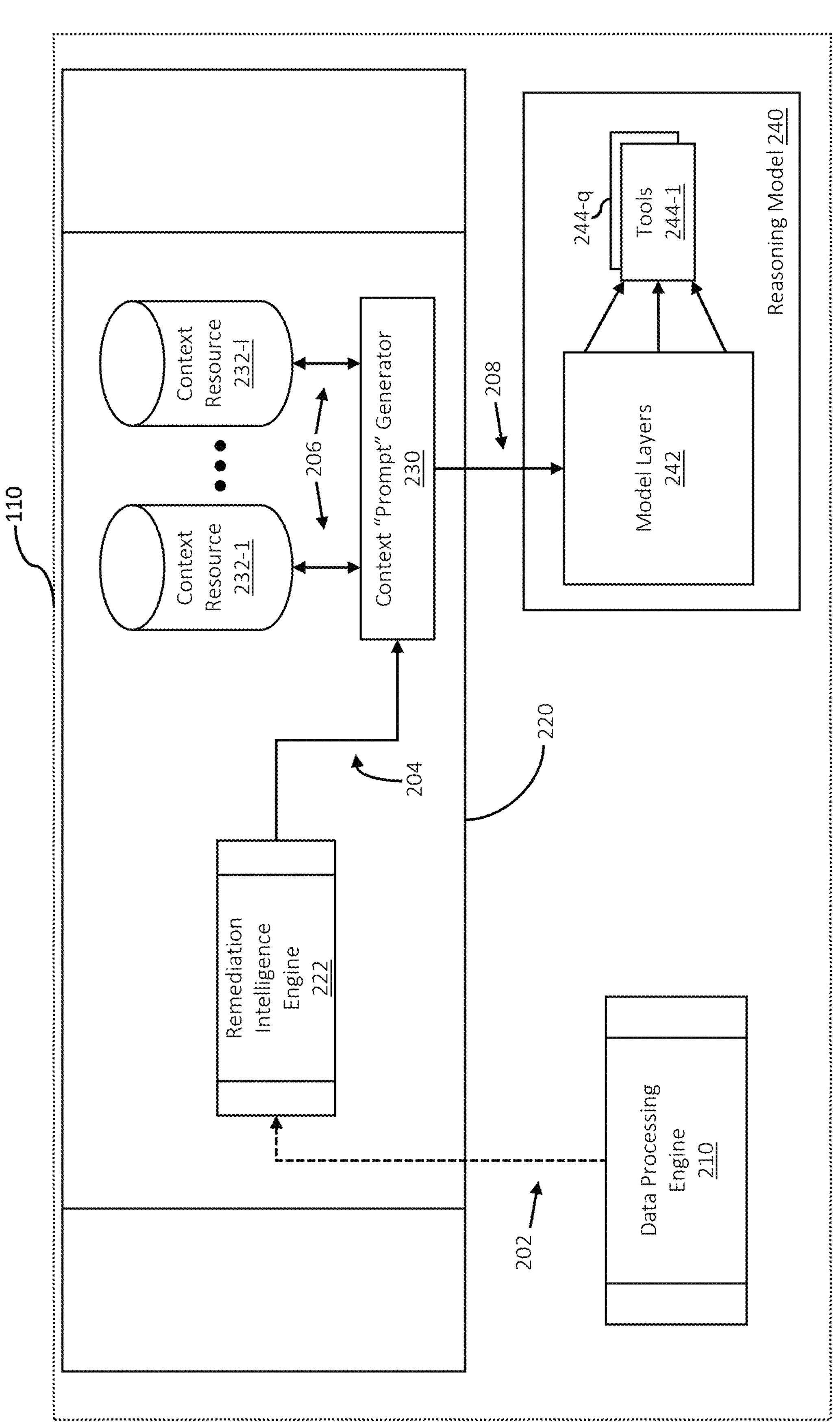
FIG. 2 is a functional diagram of an end-to-end AI asset protection system according to at least one embodiment.

FIG. 2 is an example functional diagram of the end-to-end AI asset protection system 110 according to an embodiment. As illustrated in FIG. 2, the end-to-end AI asset protection system 110 can include, but is not limited to, data processing engine 210, remediation engine 220, and reasoning model 240. The reasoning model 240 can include model layers 242 and tools 244-1, 244-*q* (hereinafter, tool 244 in the singular or tools 244 in the plural). The functional diagram of the end-to-end AI asset protection system 110 will be discussed with reference to the elements shown in FIG. 1.

Data processing engine 210 is a computation component of system 110 that ingests raw data, i.e., data that has been collected but not yet processed, cleaned, or analyzed, received from both internal and external data sources, executes operations on the data, such as filtering, sorting, and aggregating, to prepare the data for analysis, and orchestrates the data respectively downstream. Additionally, data processing engine 210 stores data, such as previously processed collected data and results from previous processes, i.e., the process results. Collected data can be data representing AI assets, such as an asset's identity, description, system prompt, connected tools 140, connected data sources 150, connected AI assets 160, and access controls, e.g., public/private, authenticated, communication channels, e.g., Microsoft Teams®, WhatsApp®, API endpoints.

Remediation engine 220 can be a reasoning engine. Remediation engine 220 is configured (e.g., trained) to perform "remediation". Remediation includes autonomously resolving security and compliance risks and security posture gaps discovered across AI assets and their ecosystems.

As an example, in at least one embodiment, performance of remediation includes, upon detecting that no runtime monitoring is being performed on a discovered AI asset, generating and applying runtime guardrails to the discovered AI asset.

As another example, in at least one embodiment, performance of remediation includes applying one or more governance policies, such as locking specific tools or search capabilities, restricting communication channels, logging all actions into the system inventory, and updating posture statuses accordingly.

The remediation engine 220 can include a remediation intelligence engine 222, a context "prompt" generator 230, and context resources 232-1, 232-1 (hereinafter, context resource 232 in the singular or context resources 232 in the plural). In at least one embodiment, remediation engine 220 can include one or more AI agents (not shown for purposes of simplicity), and the one or more AI agents can include tools.

The remediation intelligence engine 222 can be a reasoning engine. The remediation intelligence engine 222 is configured (i.e., trained and optimized) to combine data, rules, and machine learning to determine the best, fastest, and most cost-efficient way to fix issues (e.g., vulnerabilities, incidents, compliance gaps). Specifically, the remediation intelligence engine 222 can analyze process results to determine an optimal remediation path. More specifically, the remediation intelligence engine 222 can classify the process results (e.g., missing access control, data exposure, misconfiguration) and determine the optimal remediation path using risk scoring, graph algorithms, business impact, time-to-breach/urgency heuristic, exploitability, severity of violations, asset criticality, compensating controls, attacker behavior, or a combination thereof. The remediation intelligence engine 222 can include one or more tools.

The context "prompt" generator 230 is a component that creates or refines prompts, i.e., the text inputs that guide how a model produces its responses. Specifically, the context "prompt" generator 230 assists system 110 in generating the best possible instruction(s) before passing data to reasoning model 240. Context resources 232 include internal sources, such as enterprise-specific sources, and external information sources, such as up-to-date public information from the internet.

The remediation intelligence engine 222 can receive 202 process results from the data processing engine 210. Upon receiving the process results, the remediation intelligence engine 222 processes the data through its layers to initiate performance of remediation. The remediation intelligence engine 222 can feed 204 the determined optimal remediation path and the process results further through the remediation engine 220 into the context "prompt" generator 230.

Upon receiving the input, the context" prompt" generator 230 queries 206 one or more context resources 232 to access information, such as information learned through historical data or learned information through the most recent analyzed data, needed to generate contextually relevant prompts corresponding to constructing a remediation plan based on the determined optimal remediation path. Using information pulled 206 from the context resources 232, along with a pre-defined system prompt, the context "prompt" generator 230 generates a contextually relevant prompt, for example, "Based on the provided optimal remediation path, gather additional information corresponding to the data, such as information related to operational/governance/technical factors, and perform deep context reasoning using the data and the information to construct a remediation plan." The context "prompt" generator 230 feeds 208 the generated prompt (s), the determined optimal remediation path, and the process results to the reasoning model 240 for processing.

The trained reasoning model 240, herein referred to as reasoning model 240, can be a trained language model, such as a trained LLM. Model layers 242 can include the layers of the reasoning model 240, such as a perception layer, memory layer, reasoning layer, and an orchestration layer. In an embodiment, a language model may include various types and architectures, each configured to process, generate, or analyze natural language data. Such models can include, without limitation, statistical language models (e.g., n-gram models, hidden Markov models), neural network-based models (e.g., recurrent neural networks, long short-term memory (LSTM) networks, gated recurrent units (GRUs)), and transformer-based models that employ self-attention mechanisms. In certain embodiments, the language model may comprise a large language model (LLM) trained on extensive corpora of text data using unsupervised, supervised, or reinforcement learning techniques. Examples include encoder-only architectures (e.g., BERT-type models), decoder-only architectures (e.g., GPT-type models), or encoder-decoder architectures (e.g., T5-type or BART-type models). The system may further incorporate multimodal language models capable of processing both textual and non-textual data (e.g., images, audio, or structured data), or domain-specific language models fine-tuned for specialized applications such as legal, medical, or technical content analysis. In at least one embodiment, the reasoning model 240 can include one or more artificial intelligence (AI) agents (not shown for purposes of simplicity).

The reasoning model 240 may be implemented using a variety of computational architectures and frameworks designed to perform logical inference, problem solving, or decision-making based on structured or unstructured data. Such models can include, without limitation, symbolic reasoning systems (e.g., rule-based engines, knowledge graphs, expert systems), probabilistic reasoning models (e.g., Bayesian networks, Markov logic networks, probabilistic graphical models), and neural reasoning models that utilize deep learning architectures to approximate logical relationships. In certain embodiments, the reasoning model 240 may employ neuro-symbolic approaches that integrate neural networks with symbolic reasoning components to achieve explainable and generalizable inference. The reasoning model 240 may further include chain-of-thought, program-of-thought, or retrieval-augmented reasoning mechanisms configured to generate intermediate logical steps or to incorporate external knowledge sources dynamically during inference. Additionally, hybrid reasoning frameworks may combine statistical inference with deterministic rule evaluation to enhance robustness, interpretability, and adaptability across diverse application domains. Additionally, the reasoning model 240 can include a textual recipe book. The textual recipe book serves as a repository including a structured collection of repeatable "recipes" for identifying, diagnosing, and resolving issues, i.e., security and compliance risks and security posture gaps. For example, a remediation plan recipe can define a reliable, step-by-step method for correcting a specific security posture gap, while an execution recipe can describe how to apply the remediation safely and consistently. An example recipe entry can include statements, such as "For this type of issue, create a new policy in Netskope® to perform X, Y, and Z" or "For this security risk, configure a new rule within Zscaler®."

The reasoning model 240 is configured to receive contextually relevant prompts. The reasoning model 240 is further configured (i.e., trained, fine-tuned, and validated) to execute the prompt to generate an internal thought state that encapsulates context, goals, and possible actions. Based on the generated internal thought state, the reasoning model 240 determines an action or action sequence intended to be performed by system 110. The actions may involve calling tools 244. When calling a tool 244, the reasoning model 240 is configured to generate a structured call, e.g., JSON, that includes parameters describing the action to be performed.

The reasoning model 240 is further configured to process a system prompt, generated contextually relevant prompt(s), process results, and an optimal remediation plan. In at least one embodiment, the reasoning model 240 is further configured (i.e., trained and fine-tuned) to generate corrective actions to neutralize/resolve each confirmed security risk, compliance risk, and security posture gap, across the discovered AI assets and their ecosystems, as previously described.

In at least one embodiment, the reasoning model 240 is further configured to perform simulations of the generated corrective actions to verify underlying root causes and assess potential/operational/security impacts prior to implementation, as previously described.

In at least one embodiment, the reasoning model 240 is further configured to execute generated corrective actions within both the internal system 110 and external systems, as previously described.

In at least one embodiment, the reasoning model 240 is further configured to implement a closed-loop verification process, by which the reasoning model 240 can validate success through post-action reevaluation, ensuring all issues, i.e., security posture gaps and security and compliance risks, have been neutralized or resolved, as previously detailed.

Tools 244 are configured to execute a query/action, in response to a structured call, and return a result. Once tool 244 executes the query/action, e.g., run Python, search documents, query APIs, and subsequently, returns a result, the result is re-ingested by the reasoning model 240 along with the prior context, allowing the reasoning model 240 to update its internal thought state and thus, synthesize a final answer. The reasoning model 240 is further configured to generate a final response based on the initial reasoning produced by the reasoning model 240 and the result of one or more interactions with tools 244. In at least one embodiment, this thought-reasoning-action-response cycle of the reasoning model 240 may repeat multiple times if the problem requires iterative reasoning and/or the use of multiple tools 244.

It should be noted that the end-to-end AI asset protection system 110 and any of its modules 210, 220, and layers 240, 242 may be realized as a piece of software code. End-to-end AI asset protection system 110 may be realized often as just-in-time compiled software code. As used herein, the term "software" refers to one or more sequences of instructions, logic, or routines, including but not limited to source code, object code, intermediate code, interpretable code, or executable code, that may be stored on a non-transitory computer-readable medium and executed by one or more processors. The software may be implemented using one or more machine learning frameworks, including but not limited to TensorFlow™, PyTorch™, ONNX™, or equivalent platforms. The software may be executed in virtualized environments, such as containers or serverless architectures, or may be deployed via cloud infrastructure. The term "hardware" refers to one or more physical computing devices or components capable of performing operations, including model training, inference, and/or data processing.

Figure 4:
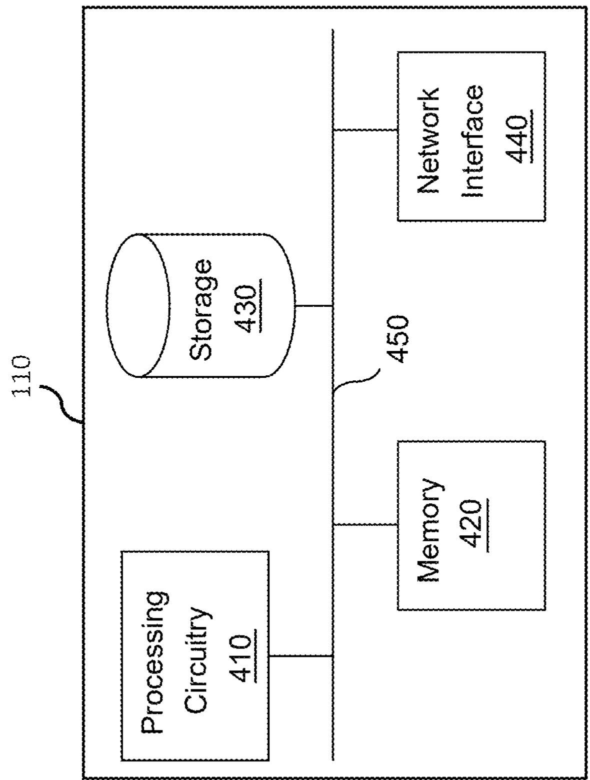
FIG. 4 is a block diagram of a computing architecture of an end-to-end AI asset protection system according to at least one embodiment.

Non-limiting examples of hardware include: Central Processing Units (CPUs); Graphics Processing Units (GPUs); Tensor Processing Units (TPUs); Application-Specific Integrated Circuits (ASICs); Field Programmable Gate Arrays (FPGAs); Neural Processing Units (NPUs) or equivalent dedicated AI accelerators; On-device microcontrollers or edge processors capable of running trained models, and the like. The described embodiments are not limited to any particular implementation platform and may be deployed across heterogeneous environments comprising combinations of the above. An example hardware layer implementation of the end-to-end AI asset protection system 110 in hardware is shown in FIG. 4.

Figure 3:
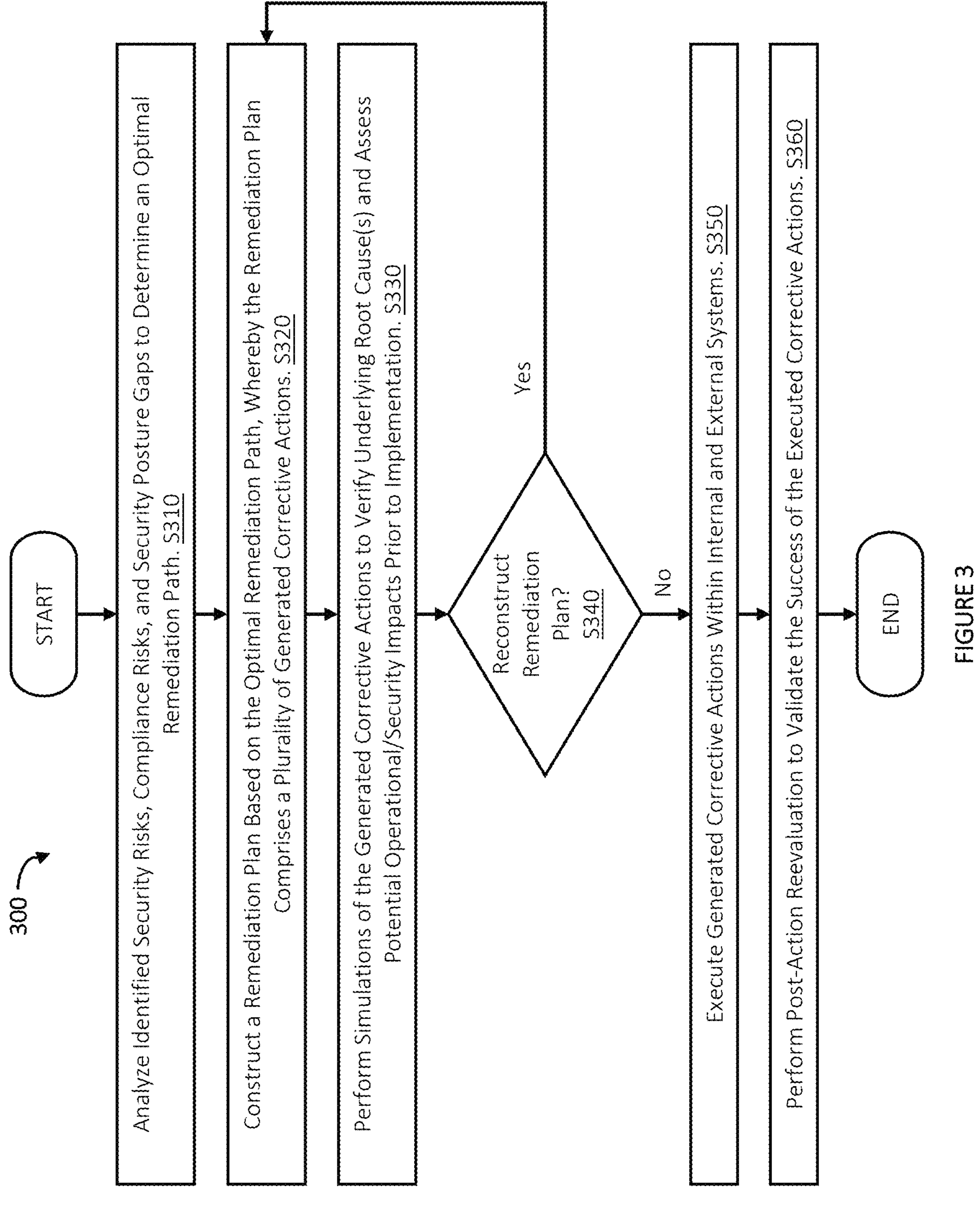
FIG. 3 is an operational flowchart illustrating a process for end-to-end AI asset remediation according to at least one embodiment.

FIG. 3 is an operational flowchart diagram illustrating a method 300, also referred to as process 300, for end-to-end AI asset remediation according to at least one embodiment. In some embodiments, the method may be performed by a system, such as end-to-end AI asset protection system 110 shown in FIGS. 1 and 2. The method is executed to resolve all identified security risks, compliance risks, and security posture gaps across all discovered AI assets within an enterprise environment 100. The method will be discussed with reference to the elements shown in FIGS. 1 and 2.

Prior to S310, data is collected from platforms 130 within the enterprise environment 100 through various connections. As previously described, data, such as metadata, runtime data, and configuration and system data are ingested from platforms 130 through various read-only integrations, telemetry, and the like. Additionally, prior to S310, all AI assets within an enterprise environment 100 are discovered and identified, herein referred to as discovered AI assets. Moreover, prior to S310, the security and compliance posture of each discovered AI asset is analyzed to determine whether it presents, or could potentially present, any security or compliance risks. Also, prior to S310, the runtime execution of each discovered AI asset across the enterprise environment 100 is monitored and analyzed to identify any existing security posture gaps. Furthermore, upon confirmation of security risks, compliance risks, and/or security posture gaps, it is determined that remediation of these risks and gaps is required.

At S310, the identified security risks, compliance risks, and security posture gaps are analyzed to determine an optimal remediation path. As previously described, the optimal remediation path can be the strategically best sequence of actions (e.g., modifying asset configurations, rotating credentials, disabling integrations, alerting external systems, adjusting enforcement rules, adjusting certain thresholds) to maximize risk reduction as rapidly and efficiently as possible across the enterprise environment 100. Process results, including the identified security risks, compliance risks, and security posture gaps, can be processed through the remediation engine 220 to derive the optimal remediation path. More specifically, the remediation intelligence engine 222, within the remediation engine 220, can classify the process results (e.g., missing access control, data exposure, misconfiguration) and determine the optimal remediation path using risk scoring, graph algorithms, business impact, time-to-breach/urgency heuristics, exploitability, severity of violations, asset criticality, compensating controls, attacker behavior, or any combination thereof. The resulting optimal remediation path can be provided as a path, sequence, or prioritized set of actions designed to maximize enterprise-wide risk reduction as rapidly and efficiently as possible.

At S320, a remediation plan is constructed based on the determined optimal remediation path. The reasoning model 240 can construct a remediation plan by analyzing the identified security posture gaps and security and compliance risks, the established platform 130 integrations, organizational policies, and the textual recipe book. Using this information, the reasoning model 240 can derive a plurality of corrective actions that collectively address and neutralize each confirmed security posture gap and security and compliance risk across the discovered AI assets and their associated ecosystems. More specifically, as previously described, the determined optimal remediation path, together with a system prompt and any contextually relevant prompts, is processed by the reasoning model 240 to generate the remediation plan. This includes mapping the security posture gaps and the security and compliance risks to relevant security frameworks, applying risk-based reasoning and defense best practices, and generating actionable, context-aware fixes supported by structured remediation guidance. The reasoning model 240 can also perform advanced reasoning, including chain-of-thought analysis, leveraging contextual state, historical interactions, policy definitions, posture evolution, risk context, and data-sensitivity information. The resulting remediation plan integrates the determined optimal remediation path while also accounting for additional constraints and considerations, such as regulatory requirements, system dependencies, business risk acceptance, team capacity, and patch availability.

At S330, simulations of the generated corrective actions are performed to verify underlying root cause(s) and assess potential operational or security impacts prior to implementation. As previously described, simulations can be executed by applying the generated corrective actions within a controlled environment (e.g., staging, sandbox, digital twin) that mirrors the production environment, monitoring their effects, and validating that the corrective actions resolve the issues without introducing new problems. The results of the simulations can then be analyzed by processing them through the reasoning model's 240 internal model layers 242.

At S340, it is determined whether the constructed remediation plan requires reconstruction. Reconstruction can include modifications/changes of/to one or more corrective actions, addition of new corrective actions, removal of corrective actions, or a combination thereof. According to at least one implementation, if the constructed remediation plan requires reconstruction (S340, "YES" branch), execution proceeds back with S320. In at least one embodiment, it is determined that the constructed remediation plan requires reconstruction based on the results of the simulations performed in S330. For example, the simulation results can reveal a different or deeper root cause, expose unintended impacts, indicate that certain corrective actions require additional steps or revised sequencing, show that some corrective actions are unnecessary, or prompt reevaluation of compliance or governance requirements. Accordingly, reperformance of S320 is required to modify the constructed remediation plan, such as by updating sequencing and priorities, expanding or refining corrective actions, adjusting timelines, introducing new approval requirements, adding compensating controls, or revising communication plans, thereby ensuring that the resulting remediation plan is more accurate, safe, and aligned with the actual behavior of the enterprise environment 100. According to at least one implementation, if it is determined that the constructed remediation plan does not require reconstruction (S340, "NO" branch), execution proceeds with S350.

At S350, the generated and verified corrective actions are executed across internal system 110 and external systems. As previously described, generated corrective actions targeting internal systems 110 can be executed through internal APIs, orchestration or automation frameworks, and internal policy engines. Similarly, as previously described, generated corrective actions targeting external systems can be executed through direct API or SDK calls, third-party tools, automation or orchestration platforms, and external policy engines. In at least one embodiment, generated corrective actions can be deployed fully autonomously. In at least one embodiment, generated corrective actions can be deployed upon user activation, i.e., semi-autonomously, such as through a client device. In at least one embodiment, data and the generated corrective actions can be sent to integrated Security Information and Event Management (SIEM) and Security Orchestration, Automation, and Response (SOAR) systems, to support their standard ingestion and automated response workflows.

At S360, post-action reevaluation is performed to validate the success of the performed remediation, i.e., the executed corrective actions. As previously described, post-action reevaluation involves a closed-loop verification process in which the posture management and runtime protection processes are reperformed to ensure that no issues persist, i.e., confirms that all identified security posture gaps and security and compliance risks have been fully neutralized or resolved and are no longer present within the enterprise environment 100.

As previously described, reperformance of the posture management process includes, but is not limited to: (1) generating a multi-dimensional graph using collected data from discovered AI assets within the enterprise environment 100; (2) converting the data and their relationships represented within the generated multi-dimensional graph into natural language text; (3) performing posture analysis using the data represented in the natural language text to validate an enterprise's governance policies across each of the discovered AI assets; (4) assessing risk scores to each of the discovered AI assets based on the performed posture analysis; and (5) identifying one or more of the discovered AI assets as being a critical risk based on their assessed risk scores.

As previously described, reperformance of the runtime protection process includes, but is not limited to: (1) analyzing collected runtime and posture data, collected from the discovered AI assets, to structure the collected runtime and posture data and identify one or more indicators of security posture gaps; (2) analyzing the structured data along with the identified one or more indicators of security posture gaps to determine a presence of one or more security posture gaps; (3) determining whether one or more additional security posture gaps could be present but not directly inferred based on the analyses; and (4) analyzing, further, the structured data, alongside user metadata, contextual states, historical interactions, and policy definitions, to determine whether the one or more additional security posture gaps are present.

In at least one embodiment, upon completion of S360, learnings, i.e., new data generated throughout the entire remediation process, are fed into the reasoning model's 240 knowledge base to continuously improve the accuracy and performance of the reasoning model 240 over time.

In at least one embodiment, AI asset remediation 300 runs continuously. In at least one embodiment, AI asset remediation 300 runs on a schedule. In at least one embodiment, AI asset remediation 300 is retriggered by new events.

Although FIG. 3 shows example blocks of the method 300, in some implementations, process 300 may include additional blocks, fewer blocks, different blocks, or differently arranged blocks than those depicted in FIG. 3. Additionally, or alternatively, two or more of the blocks of process 300 may be performed in parallel.

FIG. 4 is an example block diagram of a computing architecture of the end-to-end AI asset protection system 110.

The end-to-end AI asset protection system 110 includes a processing circuitry 410 coupled to a memory 420, a storage 430, and a network interface 440. In an embodiment, the components may be communicatively connected via a bus 450.

The processing circuitry 410 may be realized as one or more hardware logic components and circuits. For example, and without limitation, illustrative types of hardware logic components that can be used include field programmable gate arrays (FPGAs), application-specific integrated circuits (ASICs), application-specific standard products (ASSPs), graphics processing units (GPUs), system-on-a-chip systems (SOCs), general-purpose microprocessors, microcontrollers, digital signal processors (DSPs), and the like, or any other hardware logic components that can perform calculations or other manipulations of information.

In at least some embodiments, the processing circuitry 410 is configured to execute generative artificial intelligence (genAl) models, perform inference using or otherwise apply genAl models, train genAl models, fine-tune genAl models, combinations thereof, and the like. Such genAl models are configured to produce text, images, videos, or other forms of data, and may include, but are not limited to, language models (for example, but not limited to, large language models, small language models, etc.), text-to-image artificial intelligence (AI) image generation systems, text-to-video AI video generators, combinations thereof, and the like. To this end, the processing circuitry 410 may be adapted to realize a transformer deep learning architecture (e.g., a generative pre-trained transformer [GPT], bidirectional encoder representations from transformers [BERT], text-to-text transfer transformer [T5], etc.), a diffusion model, both, and the like.

In embodiments which utilize large language models (LLMs) or otherwise perform operations which may require or be enhanced through the use of parallel processing, the processing circuitry 410 may include one or more GPUs or other processing units suitable for parallel processing. Such GPUs may be configured to perform matrix multiplication operations, including, but not limited to, performing dot product operations in order to support neural network operations (for example, by performing dot product operations for hidden layer computations) or performing dot product operations in an attention mechanism in order to compute a similarity score between vectors during attention weight computation. In at least some such embodiments using GPUs, the processing circuitry 410 may include a number of CPU cores which is equal to or greater than the number of GPUs in order to facilitate or otherwise support parallel processing via multiple GPUs.

The memory 420 may be volatile (e.g., RAM, etc.), non-volatile (e.g., ROM, flash memory, etc.), or any combination thereof. In one configuration, computer-readable instructions needed to implement one or more embodiments disclosed herein may be stored in the storage 430.

In another embodiment, the memory 420 is configured to store software. Software shall be construed broadly to mean any type of instructions, whether referred to as software, firmware, middleware, microcode, or hardware description language. Instructions may include code (e.g., in source code format, binary code format, executable code format, or any other suitable format of code). The instructions, when executed by the one or more processors, cause the processing circuitry 410 to perform the various processes described herein.

The storage 430 may be magnetic storage, optical storage, and the like, and may be realized, for example, as flash memory or other memory technology, CD-ROM, Digital Versatile Disks (DVDs), hard drives, SSD, or any other medium which can be used to store the desired information, such as log of transactions, public keys, and so on. The storage 430 may include code for executing end-to-end AI asset remediation.

The network interface 440 allows the end-to-end AI asset protection system 110 to communicate with the Internet or a local area network. The network interface 440 communicates with these elements.

It should be understood that the embodiments described herein are not limited to the specific architecture illustrated in FIG. 4 and that other architectures may be equally used without departing from the scope of the disclosed embodiments.

It should be further noted that end-to-end AI asset protection system 110 may be realized using a computing architecture similar to the architecture illustrated in FIG. 4, but that other architectures may be equally used without departing from the scope of the disclosed embodiments. Further, the memory 420 may include instructions for executing the function of the respective device.

The various embodiments disclosed herein can be implemented as any combination of hardware, firmware, and software. Moreover, the software is preferably implemented as an application program tangibly embodied on a program storage unit or computer-readable medium. The application program may be uploaded to, and executed by, a machine comprising any suitable architecture. Preferably, the machine is implemented on a computer platform having hardware such as one or more central processing units ("CPUs"), a memory, and input/output interfaces. The computer platform may also include an operating system and a micro-instruction code. The various processes and functions described herein may be either part of the microinstruction code or part of the application program, or any combination thereof, which may be executed by a CPU, whether or not such computer or processor is explicitly shown. In addition, various other peripheral units may be connected to the computer platform such as an additional data storage unit and a printing unit. Furthermore, a non-transitory computer-readable medium is any computer-readable medium except for a transitory propagating signal.

It should be understood that any reference to an element herein using a designation such as "first," "second," and so forth does not generally limit the quantity or order of these elements. Rather, these designations are generally used herein as a convenient method of distinguishing between two or more elements or instances of an element. Thus, a reference to the first and second elements does not mean that only two elements may be employed there or that the first element must precede the second element in some manner. Also, unless stated otherwise, a set of elements comprises one or more elements. In addition, terminology of the form "at least one of A, B, or C" or "one or more of A, B, or C" or "at least one of the groups consisting of A, B, and C" or "at least one of A, B, and C" used in the description or the claims means "A or B or C or any combination of these elements." For example, this terminology may include A, or B, or C, or A and B, or A and C, or A and B and C, or 2A, or 2B, or 2C, and so on.

All examples and conditional language recited herein are intended for pedagogical purposes to aid the reader in understanding the disclosed embodiments and the concepts contributed by the inventor to further the art, and are to be construed as being without limitation to such specifically recited examples and conditions. Moreover, all statements herein reciting principles, aspects, and embodiments of the invention, as well as specific examples thereof, are intended to encompass both structural and functional equivalents thereof. Additionally, it is intended that such equivalents include both currently known equivalents as well as equivalents developed in the future, i.e., any elements developed that perform the same function, regardless of structure.

What is claimed is:

1. A method for end-to-end artificial intelligence (AI) asset remediation, comprising:

analyzing a plurality of identified security risks, compliance risks, and security posture gaps to determine an optimal remediation path;

constructing a remediation plan based on the optimal remediation path, whereby the constructed remediation plan comprises a plurality of generated corrective actions;

prior to executing the plurality of generated corrective actions, performing one or more simulations of the plurality of generated corrective actions within a controlled environment that mirrors a production environment to verify one or more underlying root causes and to assess potential operational, security, and stability impacts of the plurality of generated corrective actions;

executing the plurality of generated corrective actions across internal and external systems; and performing post-action reevaluation to validate that execution of the plurality of generated corrective actions neutralized and resolved at least one of the plurality of identified security risks, the plurality of identified compliance risks, and the plurality of identified security posture gaps.

2. The method of claim 1, further comprising:

reconstructing the constructed remediation plan based on results of the performed one or more simulations, wherein the simulation results indicate at least one of: a different or deeper root cause, an unintended operational or security impact, a requirement that one or more corrective actions include additional steps or revised sequencing, a determination that one or more corrective actions are unnecessary, or a need to reevaluate compliance or governance requirements.

3. The method of claim 1, wherein analyzing the plurality of identified security risks, compliance risks, and security posture gaps to determine the optimal remediation path comprises using, at least in part, a remediation intelligence engine to maximize risk reduction across an enterprise environment.

4. The method of claim 1, wherein performing the post-action reevaluation to validate the success of the executed plurality of generated corrective actions comprises using, at least in part, a reasoning model to implement a closed-loop verification process.

5. The method of claim 1, wherein executing the plurality of generated corrective actions across the internal and external systems comprises using, at least in part, a reasoning model to autonomously deploy the plurality of generated corrective actions.

6. The method of claim 1, wherein constructing the remediation plan based on the optimal remediation path comprises using, at least in part, a reasoning model to perform advanced reasoning to analyze the plurality of identified security risks, compliance risks, and security posture gaps, established platform integrations, organizational policies, and a textual recipe book.

7. The method of claim 1, wherein performing the one or more simulations of the plurality of generated corrective actions comprises using, at least in part, a reasoning model to apply the plurality of generated corrective actions within a controlled environment.

8. The method of claim 1, wherein the success of the executed plurality of generated corrective actions is determined based on resolving the plurality of identified security risks, compliance risks, and security posture gaps across a plurality of discovered AI assets in an enterprise environment.

9. The method of claim 1, wherein performing the post-action reevaluation further comprises:

reperforming a posture management process; and reperforming a runtime protection process.

10. The method of claim 1, further comprising:

implementing a closed-loop verification process that uses results of the performed post-action reevaluation to update remediation logic for future remediation efforts.

11. The method of claim 8, wherein a discovered AI asset comprises any one of: a tool, a data source, or an other AI asset.

12. The method of claim 1, wherein the plurality of identified security risks, compliance risks, and security posture gaps are identified through a performed posture management process and a performed runtime protection process.

13. A system for end-to-end artificial intelligence (AI) asset remediation comprising:

one or more processors configured to:

analyze a plurality of identified security risks, compliance risks, and security posture gaps to determine an optimal remediation path;

construct a remediation plan based on the optimal remediation path, whereby the constructed remediation plan comprises a plurality of generated corrective actions;

prior to executing the plurality of generated corrective actions, perform one or more simulations of the plurality of generated corrective actions within a controlled environment that mirrors a production environment to verify one or more underlying root causes and to assess potential operational, security, and stability impacts of the plurality of generated corrective actions;

execute the plurality of generated corrective actions across internal and external systems; and perform post-action reevaluation to validate that execution of the plurality of generated corrective actions neutralized and resolved at least one of the plurality of identified security risks, the plurality of identified compliance risks, and the plurality of identified security posture gaps.

14. The system of claim 13, wherein the one or more processors are further configured to:

reconstruct the constructed remediation plan based on results of the performed one or more simulations, wherein the simulation results indicate at least one of: a different or deeper root cause, an unintended operational or security impact, a requirement that one or more corrective actions include additional steps or revised sequencing, a determination that one or more corrective actions are unnecessary, or a need to reevaluate compliance or governance requirements.

15. The system of claim 13, wherein the one or more processors, when analyzing the plurality of identified security risks, compliance risks, and security posture gaps to determine the optimal remediation path, are configured to use, at least in part, a remediation intelligence engine to maximize risk reduction across an enterprise environment.

16. The system of claim 13, wherein the one or more processors, when performing the post-action reevaluation to validate the success of the executed plurality of generated corrective actions, are configured to use, at least in part, a reasoning model to implement a closed-loop verification process.

17. The system of claim 13, wherein the one or more processors, when executing the plurality of generated corrective actions across the internal and external systems, are configured to use, at least in part, a reasoning model to autonomously deploy the plurality of generated corrective actions.

18. The system of claim 13, wherein the one or more processors, when constructing the remediation plan based on the optimal remediation path, are configured to use, at least in part, a reasoning model to perform advanced reasoning to analyze the plurality of identified security risks, compliance risks, and security posture gaps, established platform integrations, organizational policies, and a textual recipe book.

19. The system of claim 13, wherein the one or more processors, when performing the one or more simulations of the plurality of generated corrective actions, are configured to use, at least in part, a reasoning model to apply the plurality of generated corrective actions within a controlled environment.

20. The system of claim 13, wherein the success of the executed plurality of generated corrective actions is determined based on resolving the plurality of identified security risks, compliance risks, and security posture gaps across a plurality of discovered AI assets in an enterprise environment.

21. The system of claim 20, wherein a discovered AI asset comprises any one of: a tool, a data source, or an other AI asset.

22. The system of claim 13, wherein the one or more processors, when performing the post-action reevaluation, are configured to:

reperform a posture management process; and reperform a runtime protection process.

23. The system of claim 13, wherein the one or more processors are further configured to:

implement a closed-loop verification process that uses results of the performed post-action reevaluation to update remediation logic for future remediation efforts.

24. The system of claim 13, wherein the plurality of identified security risks, compliance risks, and security posture gaps are identified through a performed posture management process and a performed runtime protection process.

25. A non-transitory computer-readable medium storing a set of instructions for end-to-end artificial intelligence (AI) asset remediation, the set of instructions comprising:

one or more instructions that, when executed by one or more processors of a device, cause the device to:

analyze a plurality of identified security risks, compliance risks, and security posture gaps to determine an optimal remediation path;

construct a remediation plan based on the optimal remediation path, whereby the constructed remediation plan comprises a plurality of generated corrective actions;

prior to executing the plurality of generated corrective actions, perform one or more simulations of the plurality of generated corrective actions within a controlled environment that mirrors a production environment to verify one or more underlying root causes and to assess potential operational security, and stability impacts of the plurality of generated corrective actions;

execute the plurality of generated corrective actions across internal and external systems; and perform post-action reevaluation to validate that execution of the plurality of generated corrective actions neutralized and resolved at least one of the plurality of identified security risks, the plurality of identified compliance risks, and the plurality of identified security posture gaps.

* * * * *